INVENTOR
CLIFFORD L. PAYNE
BY [signature]
ATTORNEY

INVENTOR
CLIFFORD L. PAYNE
BY
ATTORNEY

INVENTOR
CLIFFORD L. PAYNE
BY [signature]
ATTORNEY

INVENTOR
CLIFFORD L. PAYNE
BY [signature]
ATTORNEY

United States Patent Office 3,423,663

Patented Jan. 21, 1969

3,423,663

PHASE DEMODULATED HIGH FREQUENCY BRIDGE INVERTER

Clifford L. Payne, Richardson, Tex., assignor to Varo, Inc.

Filed Aug. 9, 1966, Ser. No. 571,267

U.S. Cl. 321—5 19 Claims

Int. Cl. H02m 7/52

This invention relates to a phase demodulated high frequency bridge inverter. It is an improvement of the low frequency power amplifier covered by U.S. patent application Ser. No. 478,595, filed Aug. 10, 1965. The subject invention has all of the advantages and objects of the aforementioned application Ser. No. 478,595, plus other advantages and objects to be enumerated hereafter.

This invention is an improvement over prior art devices since it reduces the circulating reactive power in the output filter, in the power transformer, and in the primary power transistors. Further, this invention provides a phase demodulated high frequency inverter with a higher efficiency and lighter weight than prior art devices.

This invention differs from application Ser. No. 478,595 in the manner in which the bilateral switches are actuated. In application Ser. No. 478,595 actuation is attained by phase locking a push-pull set of bilateral switches to the power from the transformer. In the subject invention actuation is attained by phase locking a bridge configuration of bilateral switches to the power from the transformer.

Further, in application Ser. No. 478,595 the voltage requirements are twice the voltage requirements of the subject invention. In the configurations of application Ser. No. 478,595 either one power transformer is utilized with two switches or two power transformers are used with four switches. In the subject invention one power transformer is used with four switches and less power is consumed.

In the subject invention one ramp generator is utilized to give two ramps, i.e., emitter follower circuits. In the invention of application Ser. No. 478,595 one sine wave is used for regulation whereas in the subject invention two sine waves are used for regulation. In the subject invention each of the two ramps is compared against the two sine waves giving twice the frequency of regulation. The subject invention has two regulation loops and regulates twice as much as the invention of application Ser. No. 478,595.

Accordingly it is an object of this invention to provide an improved phase demodulated high frequency inverter.

It is another object of this invention to provide a phase demodulated high frequency inverter with a higher efficiency than prior art devices.

A further object of this invention is to provide a phase demodulated high frequency inverter which is lighter in weight than prior art devices.

Still another object of this invention is to provide a phase demodulated high frequency inverter which reduces the circulating reactive power in the output filter.

Yet another object of this invention is to provide a phase demodulated high frequency inverter which reduces the circulating reactive power in the power transformer.

An additional object of this invention is to provide a phase demodulated high frequency inverter which reduces the circulated reactive power in the primary power transistors.

Still a further object of this invention is to provide a phase demodulated high frequency inverter in which the bilateral switches are actuated by phase locking a bridge configuration of bilateral switches to the power from the transformer.

Still an additional object of the invention is to provide a phase demodulated high frequency inverter utilizing one power transformer with four switches and consuming less power than prior art devices.

Yet an additional object of the invention is to provide a phase demodulated high frequency inverter utilizing one ramp generator to give two ramps.

A still further object of the invention is to provide a phase demodulated high frequency inverter in which two sine waves are used for regulation.

Yet another object of the invention is to provide a phase demodulated high frequency inverter in which each of two ramps is compared against two sine waves giving twice the frequency of regulation and in which two regulation loops regulate more than prior art devices.

Further objectives and advantages of the invention will be apparent to those skilled in the art from a reading of the following detailed description thereof when viewed in the light of the accompanying drawings wherein.

Figures 3, 4, 5, 6, 7, 8, 9, 10, 11, 12, 13, 14:
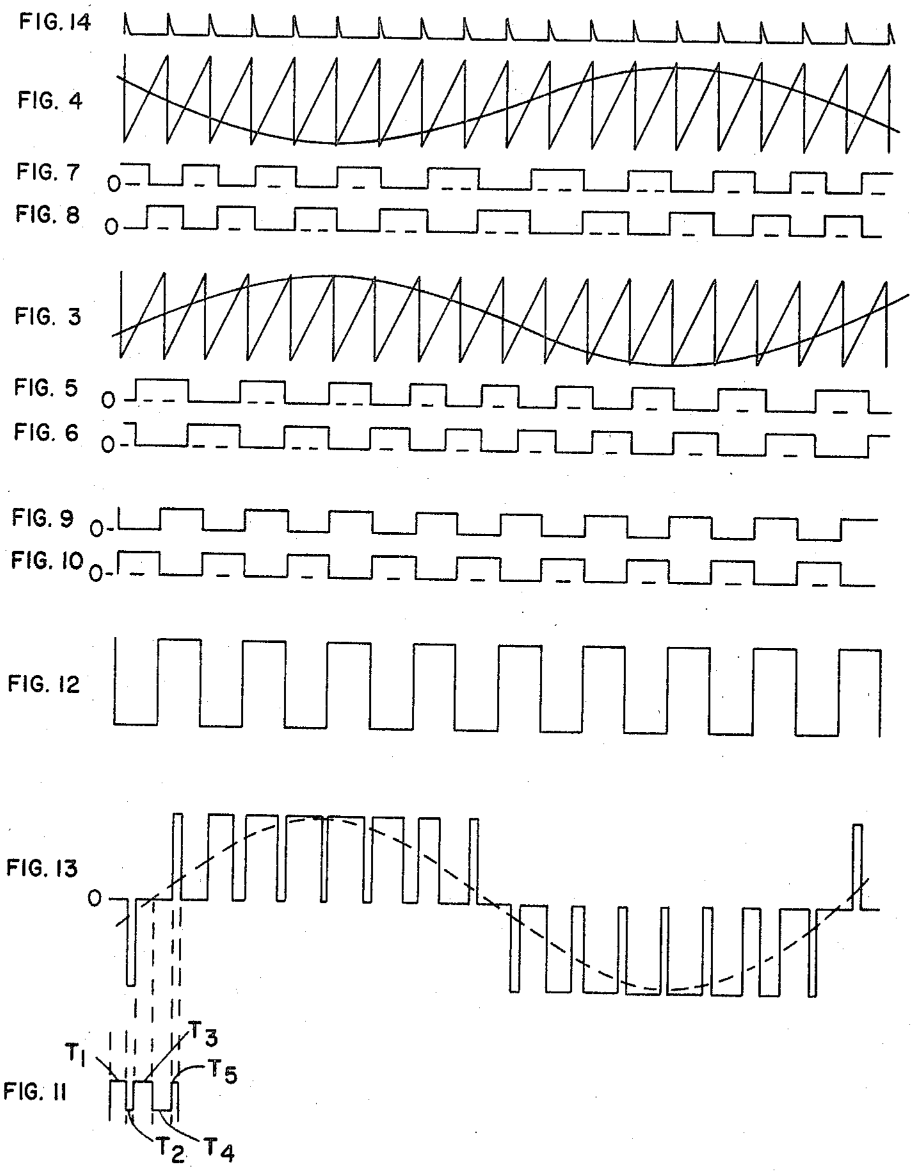

FIGURE 3 is a wave form diagram of the linear saw tooth ramp current flowing through resistor 21 and tunnel diode 22 and of the in phase sine wave error current flowing through tunnel diode 22.

FIGURE 4 is a wave form diagram of the linear saw tooth ramp current flowing through resistor 23 and tunnel diode 24 and of the inverted sine wave error current flowing through tunnel diode 24.

FIGURE 5 is a wave form diagram of the output voltage of the flip-flop 12A at the collector of transistor 26.

FIGURE 6 is a wave form diagram of the output voltage of the flip-flop 12A at the collector of transistor 25.

FIGURE 7 is a wave form diagram of the output voltage of the flip-flop 12B at the collector of transistor 27.

FIGURE 8 is a wave form diagram of the output voltage of the flip-flop 12B at the collector of transistor 28.

FIGURE 9 is a wave form diagram of the output voltage of the flip-flop 4 at the collector of transistor 31.

FIGURE 10 is a wave form diagram of the output voltage of flip-flop 4 at the collector of transistor 32.

FIGURE 11 is a diagram of the time period used to develop the phase demodulator output.

FIGURE 12 is a wave form diagram of the output voltage of the power amplifier 2.

FIGURE 13 is a wave form diagram of the development of the output voltage wave form of the phase demodulator and the sine wave output voltage wave form of the inverter from time periods.

FIGURE 14 is a wave form diagram of the high frequency oscillator pulse received by flip-flop 4 at the start of time period T4.

Figure 15:
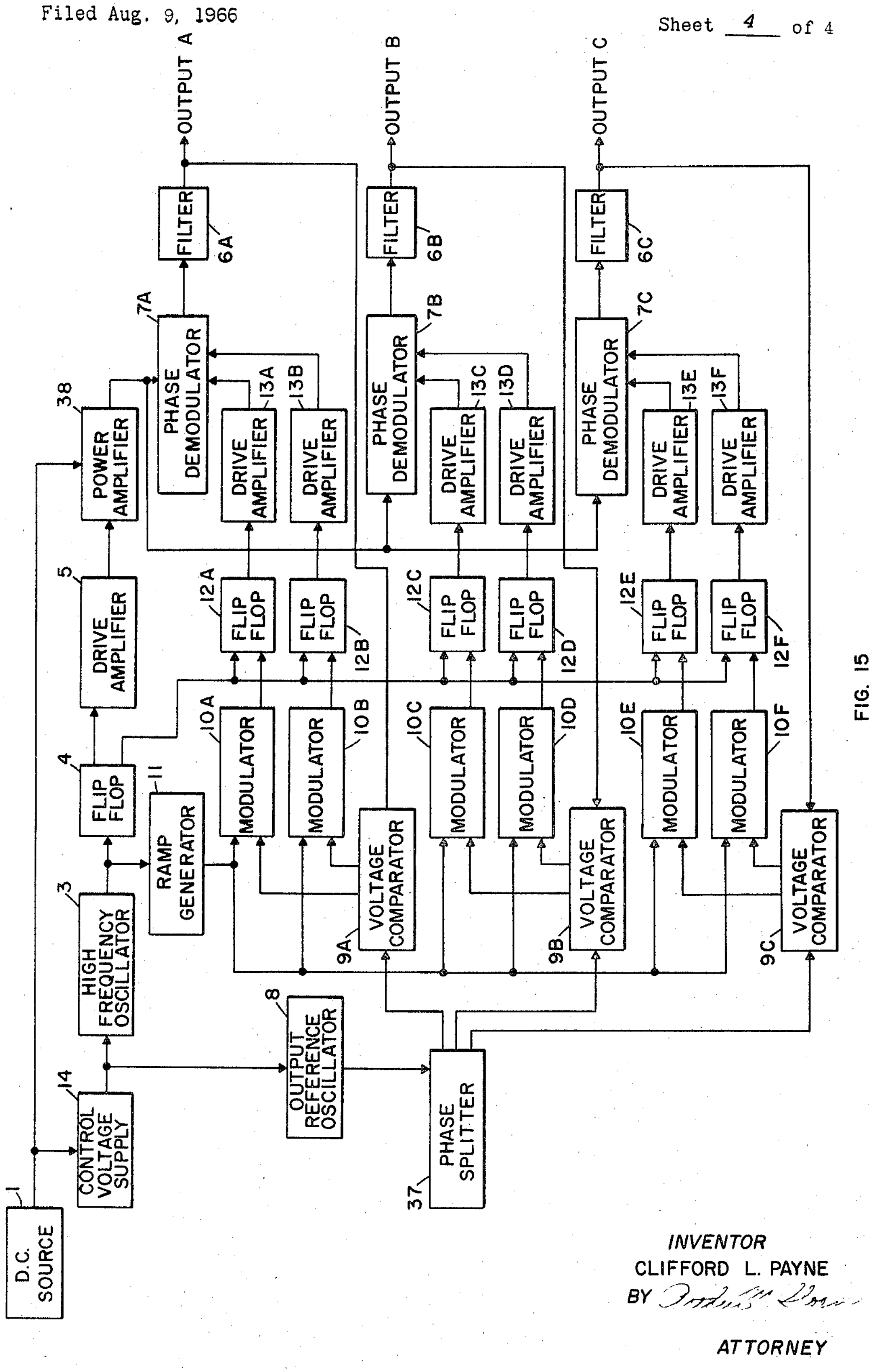

FIGURE 15 is a block diagram of a three phase embodiment of the single phase inverter of this invention.

Figure 16:
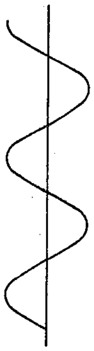

FIGURE 16 is a wave form diagram of one of the three sinusoidal output voltages resulting from the division of the output of the output reference oscillator by the phase splitter.

Figure 17:
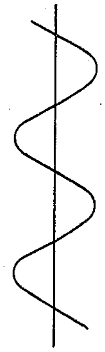

FIGURE 17 is a wave form diagram of a second sinusoidal output voltage resulting from the division of the output of the output reference oscillator by the phase splitter.

Figure 18:
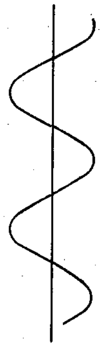

FIGURE 18 is a wave form diagram of a third sinusoidal output voltage resulting from the division of the output of the output reference oscillator by the phase splitter.

Figure 19:
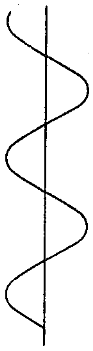

FIGURE 19 is a wave form diagram of the input to the phase splitter from the output reference oscillator 8.

Figure 1:
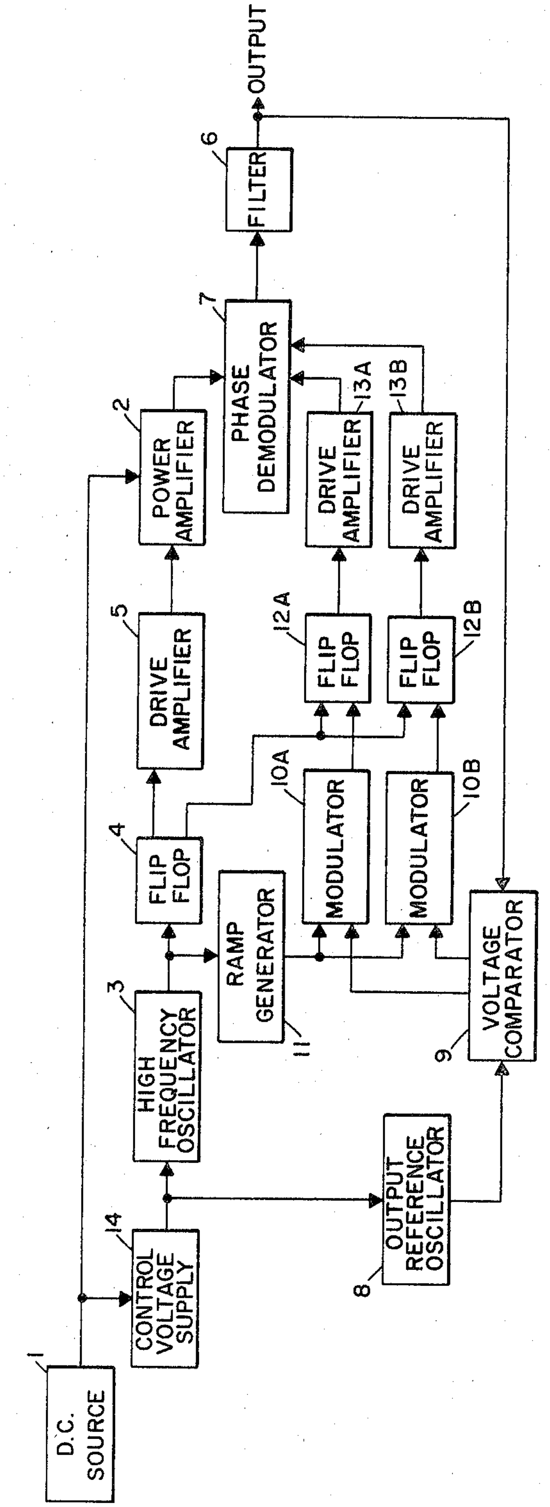
FIGURE 1 is a block diagram of a single phase inverter in accordance with the invention.

Referring to the drawings, the single phase inverter shown in FIGURE 1 converts direct current energy to alternating current energy of a precision amplitude, frequency and phase relationship to the reference control signal. The inverter includes a number of operating modules which operate in the following manner. Direct current power from direct current source 1 is converted to alternating current square wave power by power amplifier 2. Power amplifier 2 is driven by high frequency oscillator 3 through flip-flop 4 and drive amplifier 5. The output of power amplifier 2 is fed into filter 6 through phase demodulator 7 which controls the output frequency, amplitude, and phase. The output of the filter 6 is compared to the sine wave of output reference oscillator 8 by the voltage comparator 9. The modulators 10A and 10B are driven by the ramp generator 11 and voltage comparator 9. The outputs of the modulators 10A and 10B triggers flip-flops 12A and 12B, which drives the phase demodulator 7 through the drive amplifiers 13A and 13B. Control voltage supply 14, which is connected to the direct current source 1 provides the power for the control functions of the inverter.

The major changes from the Low Frequency Power Amplifier of application Ser. No. 478,598, filed Aug. 10, 1965, are illustrated schematically in FIGURE 2. The phase demodulator 7 includes four bilateral switches connecting the output of the power amplifier 2 to the output filter 6 in a bridge arrangement, rather than a push-pull arrangement. Also, two separate drive circuits are required for the phase demodulator 7. One drive signal is developed by modulator 10A and flip-flop 12A while the second drive signal is developed by modulator 10B and flip-flop 12B. These signals are then amplified through drive amplifiers 13A and 13B to drive power transistors 15, 16, 17, and 18.

Figure 2:
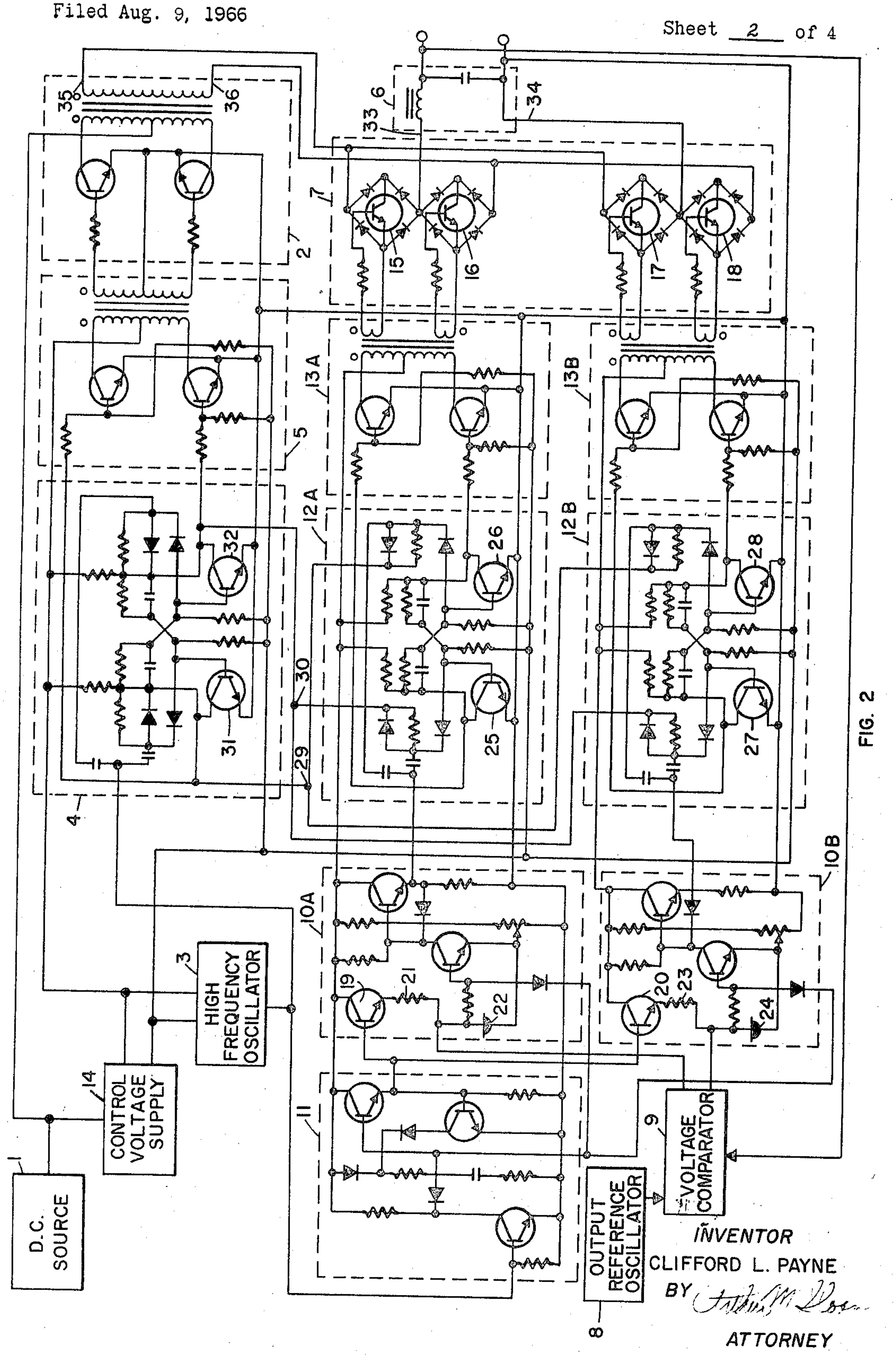
FIGURE 2 is a schematic representation showing phase relationships of the various components of the single phase inverter.

A discussion of the various wave forms and their location in FIGURE 2 will give a better understanding of the basic operation of the bridge phase demodulator 7. The voltage comparator 9, ramp generator 11, and modulators 10, have replaced the reference comparator of the Low Frequency Power Amplifier of application Ser. No. 478,-598, filed Aug. 10, 1965. The ramp generator 11 operates as does the ramp generator, i.e., emitter follower circuit in the reference comparator of the above referenced application. The output of the ramp generator 11 is connected to the two modulators 10A and 10B in an emitter-follower configuration through the emitters of transistors 19 and 20. This results in a ramp current illustrated in FIGURE 3 flowing through resistor 21 and tunnel diode 22. An identical ramp current illustrated in FIGURE 4 flows through resistor 23 and tunnel diode 24. Also flowing through tunnel diode 22 and tunnel diode 24 are the sine wave currents illustrated in FIGURES 3 and 4. The sine wave current illustrated in FIGURE 3 is in phase with the output voltage while the sine wave current illustrated in FIGURE 4 is 180° out of phase. These currents are made a direct function of the output voltage and the voltage from the output reference oscillator 8 by the voltage comparator 9. The voltage comparator 9 is a high gain differential amplifier with an emitter-follower circuit connected to its two outputs. Anytime the output varies with respect to the reference voltage from the output reference oscillator 8 there is a corresponding change in the sine wave current of FIGURES 3 and 4.

As described in the above referenced application, whenever either sine wave current crosses its ramp, that tunnel diode, through which the sine wave current is flowing, changes voltage levels turning on its associated transistor to generate a pulse which triggers the associated flip-flop 12 causing it to change states. The collector voltages of transistors 25 and 26 of flip-flop 12A are illustrated in FIGURES 5 and 6. The collector voltages of transistors 27 and 28 of flip-flop 12B are illustrated in FIGURES 7 and 8. To insure proper phase relationship of the power amplifier stage 2 and the phase demodulator 7, flip-flops 12A and 12B are locked to flip-flop 4 through the interconnections illustrated in FIGURE 2 at points 29 and 30. The collector voltages of transistors 31 and 32 are illustrated in FIGURES 9 and 10.

The schematic FIGURE 2 and the wave forms shown in FIGURES 3 through 14 illustrate the varying phase relationships between the power amplifier 2, the phase demodulator 7, and the modulators 10A and 10B. By taking several time periods, as illustrated in FIGURE 11, the output wave form of the phase demodulator 7 may be developed.

The first period covered is time period T1 which represents the time when flip-flops 4, 12A and 12B are set so that transistors 26, 28, and 31 are on. Inspection of the schematic FIGURE 2 shows that for this condition phase demodulator transistors 16 and 18 are on while transistors 15 and 17 are off. This places a short across the input to the filter 6 points 33 and 34. This also disconnects the filter 6 from the power amplifier 2 which has an output voltage as illustrated in FIGURE 12. The output voltage of the phase demodulator 7 or input voltage to the filter 6 for time period T1 is therefore zero as illustrated in FIGURE 13.

At the start of time period T2, flip-flop 12A receives a pulse from modulator 10A which causes the flip-flop to reverse state. This in turn causes demodulator transistor 16 to turn off and demodulate transistor 15 to turn on. This connects point 33 of the filter 6 to point 35 of the power amplifier 2 through demodulator transistor 15. Point 34 is connected to point 36 through transistor 18. This produces a voltage at the input of the filter 6 as illustrated in FIGURE 13 for time period T2.

At the start of the time period T3, flip-flop 12B receives a pulse from modulator 10B which causes the flip-flop to reverse state. This in turn causes demodulator transistor 18 to turn off and demodulator transistor 17 to turn on. This shorts out the input to the filter 6 and disconnects the power amplifier 2. The input voltage to the filter 6 is again zero for time period T3 as illustrated in FIGURE 13.

At the start of period T4, flip-flop 4 receives a pulse, illustrated in FIGURE 14, from the high frequency oscillator which causes the flip-flop 4 to change states. This turns transistor 31 off while turning on transistor 32, which causes the output of the power amplifier 2 to reverse. Since the demodulator transistors 15, 16, 17, and 18 did not change state, the input to the filter 6 remains shorted until time period T5.

At the start of time period T5, modulator 10B provides a pulse to flip-flop 12B which causes transistor 28 to turn on and transistor 27 to turn off. This causes demodulator transistor 18 to turn on and transistor 17 to turn off which connects point 34 of the filter 6 to point 36 of the power amplifier 2 through demodulator transistor 18. Point 33 is connetced to point 35 through transistor 15.

By continuing this switching action, the output voltage wave form of the phase demodulator 7 is developed as shown by the solid line in FIGURE 13. This is filtered by the filter 6 to produce the sine wave output voltage illustrated in FIGURE 13 as a dashed line.

A three phase version of the single phase inverter described above is shown in block form in FIGURE 15. The primary difference between the three phase inverter and the single phase inverter is the addition of the phase splitter 37. The phase splitter 37 is driven by the output reference oscillator 8 and divides the output of the output reference oscillator into three sinusoidal voltages A, B, and C which have a phase angle of 120° between phases. These three sinusoidal voltages are shown in FIGURES 16, 17, and 18. The input to the phase splitter 37 is shown in FIGURE 19. FIGURE 16 shows voltage A, FIGURE 17 shows voltage B. FIGURE 18 shows voltage C. Each of these three phases A, B, and C is utilized by its voltage comparator 9A, 9B, or 9C in the same manner described in the above discussion of the single phase inverter. The new power amplifier 38 has three separate outputs, one for each of the phase demodulators 7A, 7B, and 7C.

Various blocks in FIGURE 15 are designated as in FIGURE 1 where identical components to those in FIGURE 1 are utilized, with alphabetical letters indicating additional units. Since these components which appear also in FIGURE 1 perform in the identical manner previously described, the description of their operation will not be repeated.

Referring again to FIGURES 1 and 2, it is apparent that if the output reference oscillator 8 were removed from the inverter and an external reference voltage was substituted, the output of the inverter would be a function of the external reference voltage. Since the external reference voltage determines the $I_p$ point of the tunnel diodes 22 and 24, FIGURE 2, the output will have a definite phase, amplitude and frequency that is determined specifically by the external reference voltage. This enables the inverter to be remotely controlled from a distant point by any external source which needs to be amplified. Accordingly, the inverter is an ideal driving source for converting direct current energy to alternating current energy which is controllable by some error or reference signal and used to drive a load such as a synchronous motor or other loads whose input must be directly related to an error or reference signal.

It will be understood that modifications and variations may be effected without departing from the spirit and scope of the novel concepts of this invention.

What I claim as my invention and desire to secure by Letters Patent of the United States is:

1. A phase demodulated high frequency bridge inverter including a direct current source, a control voltage supply connected to the direct current source for providing power for the control functions of the inverter, a high frequency oscillator connected to the control voltage supply, a first flip-flop connected to the high frequency oscillator, a first drive amplifier connected to the first flip-flop, a power amplifier connected to the first drive amplifier, said power amplifier being also connected to the direct current source and being driven by the high frequency oscillator through the first flip-flop and the first drive amplifier, said power amplifier converting direct current power from the direct current source to alternating current square wave power, a phase demodulator connected to the power amplifier, said phase demodulator controlling the output frequency, amplitude, and phase, a filter connected to the phase demodulator into which the output of the power amplifier is fed, an output reference oscillator connected between the control voltage supply and the high frequency oscillator, a voltage comparator connected to the output reference oscillator and to the output from the filter, said voltage comparator comparing the output of the filter to the sine wave of the output reference oscillator, a ramp generator connected between the high frequency oscillator and the first flip-flop, a first modulator connected between the ramp generator and the voltage comparator, a second modulator connected between the ramp generator and the voltage comparator, the first and second modulators being interconnected and being driven by the ramp generator and voltage comparator, a second flip-flop connected between the first flip-flop and the first modulator, a third flip-flop connected between the first flip-flop and the second modulator, the second and third flip-flops being interconnected, a second drive amplifier connected between the second flip-flop and the phase demodulator, and a third drive amplifier connected between the third flip-flop and the phase demodulator, the outputs of the first and second modulators triggering the second and third flip-flops to drive the phase demodulator through the second and third drive amplifiers.

2. A phase demodulated high frequency bridge inverter as described in claim 1 in which the phase demodulator includes four bilateral switches connecting the output of the power amplifier to the output filter in a bridge arrangement.

3. A phase demodulated high frequency bridge inverter as described in claim 2 in which each biltaeral switch includes a power transistor.

4. A phase demodulated high frequency bridge inverter as described in claim 3 in which two of the power transistors are driven by the second drive amplifier and the other two power transistors are driven by the third drive amplifier.

5. A phase demodulated high frequency bridge inverter as described in claim 1 including a transistor in the first modulator and a transistor in the second modulator in which the output of the ramp generator is connected to each modulator in an emitter follower configuration through the emitters of the modulator transistors.

6. A phase demodulated high frequency bridge inverter as described in claim 5 including a resistor connected to the transistor in the first modulator and a tunnel diode connected to this resistor and a resistor connected to the transistor in the second modulator and a tunnel diode connected to this resistor in which a ramp current flows through the resistor and tunnel diode in each modulator and a sine wave current flows through each tunnel diode, these currents being made a direct function of the output voltage and the voltage from the output reference oscillator by the voltage comparator.

7. A phase demodulated high frequency bridge inverter as described in claim 6 in which the voltage comparator is a high gain differential amplifier with an emitter-follower circuit connected to its two outputs so that anytime the output varies with respect to the reference voltage from the output reference oscillator there is a corresponding change in the sine wave current flowing through the tunnel diodes in the modulator.

8. A phase demodulated high frequency bridge inverter as described in claim 7 in which whenever the sine wave current flowing through one of the modulator tunnel diodes crosses its ramp, that tunnel diode changes voltage levels turning on its associated transistor to generate a pulse which triggers the flip-flop to which that modulator is connected causing the flip-flop to change states.

9. A phase demodulated high frequency bridge inverter including a direct current source, means for providing power for the control functions of the inverter connected to the direct current source, means connected to the direct current source for converting direct current power from the direct current source to alternating current square wave power, means for driving the means for converting direct current power from the direct current source to alternating current square wave power, he driving means being connected to the conversion means, phase demodulator means connected to the power amplifier, said phase demodulator means controlling the output frequency, amplitude, and phase, means connected to the output of the phase demodulator meeans for filtering the output voltage wave form of the phase demodulator means to produce a sine wave output voltage, an output reference oscillator connected between the means for providing power for the control functions of the inverter and the means for driving the means for converting direct current power from the direct current source to alternating current square wave power, means for comparing the output of the filtering means to the sine wave of the output reference oscillator said comparing means being connected to the output reference oscillator and to the output from the filtering means, a ramp generator connected to the means for driving the means for converting direct current power from he direct current source to alternating current square wave power, means connected to the phase demodulator for driving the phase demodulator, and means connected to the means for driving the phase demodulator for triggering the means for driving the phase demodulator said triggering means being also connected to and driven by the ramp generator and the means for comparing the output of the filtering means to the sine wave of the output reference oscillator.

10. A phase demodulated high frequency bridge inverter as described in claim 9 in which the phase demodulator includes four bilateral switches in a bridge arrangement, connecting the filtering means to the output of the means for converting direct current power from the direct current source to alternating square wave power.

11. A phase demodulated high frequency bridge inverter as described in claim 10 in which each bilateral switch includes a power transistor.

12. A phase demodulated high frequency bridge inverter as described in claim 1, adapted for the production of a three phase output in which the power amplifier has three outputs, including a phase splitter connected between the output reference oscillator and the voltage comparator so that the output reference oscillator drives the phase splitter and the phase splitter divides the output of the output reference oscillator into three sinusoidal voltages, a second phase demodulator connected to the power amplifier, said second phase demodulator controlling the output frequency, amplitude, and phase of the second phase, a second filter connected to the second phase demodulator into which the second output of the power amplifier is fed, a second voltage comparator connected to the phase splitter and to the output from the second filter, said second voltage comparator comparing the output of the second filter to the sine wave of the second sinusoidal output voltage from the phase splitter, a third modulator connected between the ramp generator and the second voltage comparator, a fourth modulator connected between the ramp generator and the second voltage comparator, the third and fourth modulators being interconnected and being driven by the ramp generator and second voltage comparator, a fourth flip-flop connected between the first flip-flop and the third modulator, a fifth flip-flop connected between the first flip-flop and the fourth modulator, the fourth and fifth flip-flops being interconnected, a fourth drive amplifier connected between the fourth flip-flop and the second phase demodulator, and a fifth drive amplifier connected between the fifth flip-flop and the second phase demodulator, the outputs of the third and fourth modulators triggering the fourth and fifth flip-flops to drive the second phase demodulator through the fourth and fifth drive amplifiers, a third phase demodulator connected to the power amplifier, said third phase demodulator controlling the output frequency amplitude, and phase of the third phase, a third filter connected to the third phase demodulator into which the third output of the power amplifier is fed, a third voltage comparator connected to the phase splitter and to the output from the third filter, said third voltage comparator comparing the output of the third filter to the sine wave of the third sinusoidal output voltage from the phase splitter, a fifth modulator connected between the ramp generator and the third voltage comparator, a sixth modulator connected between the ramp generator and the third voltage comparator, the fifth and sixth modulators being interconnected, and being driven by the ramp generator and third voltage comparator, a sixth flip-flop connected between the first flip-flop and the fifth modulator, a seventh flip-flop connected between the first flip-flop and the sixth modulator, the sixth and seventh flip-flops being interconnected, a sixth drive amplifier connected between the sixth flip-flop and the third phase demodulator, and a seventh drive amplifier connected between the seventh flip-flop and the third phase demodulator, the outputs of the fifth and sixth modulators triggering the sixth and seventh flip-flops to drive the third phase demodulator through the sixth and seventh drive amplifiers.

13. A phase demodulated high frequency bridge inverter adapted for the production of a three phase output as described in claim 12 in which each phase demodulator includes four bilateral switches connecting the output of the means for converting direct current power from the direct current source to alternating current square wave power to the phase demodulator's associated filtering means in a bridge arrangement.

14. A phase demodulated high frequency bridge inverter adapted for the production of a three phase output as described in claim 13 in which each bilateral switch includes a power transistor.

15. A phase demodulated high frequency bridge inverter as described in claim 9 adapted for the production of a three phase output in which the means for converting direct current power from the direct current source to alternating current square wave power has three outputs and including means connected between the output reference oscillator and the means for comparing the output of the filtering means to the sine wave of the output reference oscillator connected to the output of the second phase demodulator means for dividing the output of the output reference oscillator into three sinusoidal voltages which have a phase angle of 120° between phases; a second phase demodulator means connected to the second output from the means for converting direct current power from the direct current source to alternating current square wave power, said second phase demodulator means controlling the output frequency amplitude, and phase of the second phase, a second means connected to the output of the second phase demodulator means for filtering the output voltage wave form of the second phase demodulator means to produce a sine wave output voltage, a second means for comparing the output of the second filtering means to the sine wave of the second sinusoidal output voltage from the means for dividing the output of the output reference oscillator said second comparing means being connected to the means for dividing the output of the output reference oscillator and to the second filtering means, a second means connected to the second phase demodulator means for driving the second phase demodulator, and a second means connected to the second means for driving the phase demodulator means for triggering the second means for driving the phase demodulator means, said second triggering means being also connected to and driven by the ramp generator and the second means for comparing the output of the filtering means to the second sine wave output of the means for dividing the output of the output reference oscillator, a third phase demodulator means connected to the third output from the means for converting direct current power from the direct current source to alternating current square wave power, said third phase demodulator means controlling the output frequency, amplitude, and phase of the third phase, a third means connected to the output of the third phase demodulator means for filtering the output voltage wave form of the third phase demodulator means to produce a sine wave output voltage, a third means for comparing the output of the third filtering means to the sine wave of the third sinusoidal output voltage from the means for dividing the output of the output reference oscillator said third comparing means being connected to the means for dividing the output of the output reference oscillator and to the third filtering means, a third means connected to the third phase demodulator means for driving the third phase demodulator means, and a third means connected to the third means for driving the phase demodulator means for triggering the third means for driving the phase demodulator means, said third triggering means being also connected to and driven by the ramp generator and the third means for comparing the output of the filtering means to the third sine wave output of the means for dividing the output of the output reference oscillator.

16. A phase demodulated high frequency bridge inverter adapted for the production of a three phase output as described in claim 15 in which each phase demodulator includes four bilateral switches connecting the output of the means for converting direct current power from the direct current source to alternating current square wave power to its associated filtering means in a bridge arrangement.

17. A phase demodulated high frequency bridge inverter adapted for the production of a three phase output as described in claim 16 in which each bilateral switch includes a power transistor.

18. A phase demodulated high frequency bridge inverter capable of remote control including a direct current source, a control voltage supply connected to the direct current source for providing power for the control functions of the inverter, a high frequency oscillator connected to the control voltage supply, a first flip-flop connected to the high frequency oscillator, a first drive amplifier connected to the first flip-flop, a power amplifier connected to the first drive amplifier, said power amplifier being also connected to the direct current source and being driven by the high frequency oscillator through the first flip-flop and the first drive amplifier, said power amplifier converting direct current power from the direct current source to alternating current square wave power, a phase demodulator connected to the power amplifier, said phase demodulator controlling the output frequency, amplitude, and phase, a filter connected to the phase demodulator into which the output of the power amplifier is fed, a reference voltage connected between the control voltage supply and the high frequency oscillator, a voltage comparator connected to the reference voltage and to the output from the filter, said voltage comparator comparing the output of the filter to the reference voltage, a ramp generator connected between the high frequency oscillator and the first flip-flop, a first modulator connected between the ramp generator and the voltage comparator, a second modulator connected between the ramp generator and the voltage comparator, the first and second modulators being interconnected and being driven by the ramp generator and voltage comparator, a second flip-flop connected between the first flip-flop and the first modulator, a third flip-flop connected between the first flip-flop and the second modulator, the second and third flip-flops being interconnected, a second drive amplifier connected between the second flip-flop and the phase demodulator, and a third drive amplifier connected between the third flip-flop and the phase demodulator, the outputs of the first and second modulators triggering the second and third flip-flops to drive the phase demodulator through the second and third drive amplifiers.

19. A phase demodulated high frequency bridge inverter capable of remote control including a direct current source, means for providing power for the control functions of the inverter connected to the direct current source, means connected to the direct current source for converting direct current power from the direct current source to alternating current square wave power, means for driving the means for converting direct current power from the direct current source to alternating current square wave power, the driving means being connected to the conversion means, phase demodulator means connected to the power amplifier, said phase demodulator means controlling the output frequency, amplitude, and phase, means connected to the output of the phase demodulator means for filtering the output voltage wave form of the phase demodulator means to produce a sine wave output voltage, a reference voltage connected between the means for providing power for the control functions of the inverter and the means for driving the means for converting direct current power from the direct current source to alternating current square wave power, means for comparing the output of the filtering means to the reference voltage, said comparing means being connected to the reference voltage and to the output from the filtering means, a ramp generator connected to the means for driving the means for converting direct current power from the direct current source to alternating current square wave power, means connected to the phase demodulator for driving the phase demodulator and means connected to the means for driving the phase demodulator for triggering the means for driving the phase demodulator, said triggering means being also connected to and driven by the ramp generator and the means for comparing the output of the filtering means to the sine wave of the output reference oscillator.

References Cited

UNITED STATES PATENTS

| | | | |
|---|---|---|---|
| 3,253,228 | 5/1966 | Montner | 330—10 |
| 3,321,693 | 5/1967 | Heinrich et al. | 321—5 |
| 3,376,490 | 4/1968 | Osugi | 321—5 |

LEE T. HIX, *Primary Examiner.*

W. H. BEHA, Jr., *Assistant Examiner.*

U.S. Cl. X.R.

321—9, 45; 307—265